Aug. 26, 1958

V. UZIEL 2,849,347

METHOD OF TREATING CUT EDGES OF PLASTIC
FABRICS TO PREVENT FRAYING

Filed Jan. 23, 1956

INVENTOR
VICTOR UZIEL
By Young, Emery + Thompson
Attys.

United States Patent Office 2,849,347
Patented Aug. 26, 1958

2,849,347
METHOD OF TREATING CUT EDGES OF PLASTIC FABRICS TO PREVENT FRAYING

Victor Uziel, Paris, France

Application January 23, 1956, Serial No. 560,846

Claims priority, application France February 5, 1955

1 Claim. (Cl. 154—116)

It is known that textile fabrics composed of threads of synthetic plastic materials of the superpolyamide type, such as those known under the trade-name of "nylon" or "perlon," or of the acrylic type, such as that known under the trade-name of "orlon" (all registered trademarks) have the drawback, when they are cut-out, of becoming spontaneously frayed along the cut-out edge.

The result of this is that when the parts of an article made of material of this kind are cut-out, the cut edge does not remain clean and rapidly becomes unfit for sewing. Or alternatively when it has once been sewn, the cut piece does not remain attached by its seam, which is still more serious.

In order to obviate this well-known disadvantage, it has been proposed to effect the cutting out of nylon fabrics or other threads of plastic materials by means of a special heated tool. With this instrument, there is produced a melting effect of the plastic material at the point of contact and this melting gives a cut with a clean fixed edge which does not fray.

This method of working, while it completely avoids fraying is however not applicable in satisfactory conditions, except for a single piece of material. However, a method of cutting-out piece by piece is not very convenient in the manufacture of ready-made goods which, if it is to be practicable, should connote the simultaneous cutting-out of multiple thickness, to which will be applied the term "cutting-out in mass."

It has indeed been envisaged to carry out mass cutting operations of nylon fabrics or the like by means of a heated tool. When applied directly, this method of cutting was found to be bad, since the action of the heat through which the cutting of the materials is obtained, causes the cut edges of the various superposed materials to stick together.

In order to avoid this sticking, it has been proposed to interpose between successive fabrics, intermediate substances, such as paper for example. This device however did not prove satisfactory, since the cut material sticks to the interposed paper. In addition, the more forcible application of the heating tool creates blackened zones, which are, in a sense, burnt and which are thus marked in an indelible manner and appear in the finished article, producing an unsightly effect. These zones remain visible even if they are on the inside of the seams, by reason of the transparency of the nylon.

In any case, cutting out with a heated tool is only applicable with a limited number of layers of superposed fabrics. If the thickness becomes too great, the upper layers show traces of burning while the lower layers are not heated sufficiently to be cut. The result of this is that, in the mass manufacture of articles of nylon, "perlon," or other synthetic fibres, cutting out in mass has had to be abandoned and it has been necessary to fall back on cutting out piece by piece with a heated tool, which is extremely costly.

The present invention has for its object to remedy the drawbacks referred to above and to permit of cutting out in mass fabrics of plastic materials, with its attendant advantages.

The invention consists in carrying out the cut on superposed fabrics of any number of layers by the usual mechanical means and, as soon as the cut has been made, to subject at one single application, the edges of the cut fabric to the transient action of a flow of gas heated to a temperature greater than the melting point of the plastic material.

By this method, the cutting out is effected in accordance with the usual method of operation in the case of textile fabrics of natural fibre yarn, with the known advantages of this method. But with this method of working, the fraying which would inevitably be produced in the case of fabrics of plastic materials, is avoided by fixing the cut edges by the contact of the heated flow of gas.

This contact is effected by passing a flame or a current of heated air rapidly over the edges of the cut pile of fabrics. The passage of the flame or hot air may be carried out once or several times. Preferably, a number of successive passages may be made to-and-fro along each of the edges of the cut-out mass from one extremity of the edges to the other.

It is desirable to present the whole assembly of the superposed cut-out fabrics to the hot gases, the pieces being held together but left free. It is in fact advantageous if the various pieces are not in close contact. It is even preferable that they should be definitely detached from each other during the passage of the hot gases. To this end, it is an advantage to cause separation of the various pieces of fabrics, before the passage of the hot gases, by shaking the whole mass, by blowing on the edges, or by giving them a slight relative displacement.

By proceeding in the manner described above, the stabilisation of the edges of all the multiple pieces of fabric cut in ensured simultaneously under conditions which are definitely better than those obtaining with the use of the heated tool, with no risk of undesirable blackened points. This work is carried out with very great rapidity under favourable conditions for a good productivity. It effects a considerable economy in labour and time.

The device for producing the hot gases is preferably arranged in such manner that it can work at different rates and that these rates are adjustable. This special feature enables the jet to be adapted to the necessities of the case to which it is applied, of obtaining a jet of gas, the heat of which is more or less intense, according to the periods of work or rest. On the other hand, it enables the intensity of the jet of gas to be regulated in accordance with the nature of the fabric of which the edges are to be stabilised.

The invention will be described in the text following with reference to the attached drawings in which.

In accordance with the method of application of the invention, a pile or mass 10 of layers of superposed nylon fabric is cut-out in the same way as is usual with the fabrics of other textile materials, wool, linen, cotton, etc. The contour to be cut out is marked on the top fabric and the whole thickness of the materials is cut by means of a moving saw, for example, moved along the contour.

When the cutting-out is finished, the mass of cut-out pieces is hung up or is brought to the edge of the worktable 11. A flame 12 or a jet of hot air 13 is then passed along the edge of the cut pile.

Figure 1:
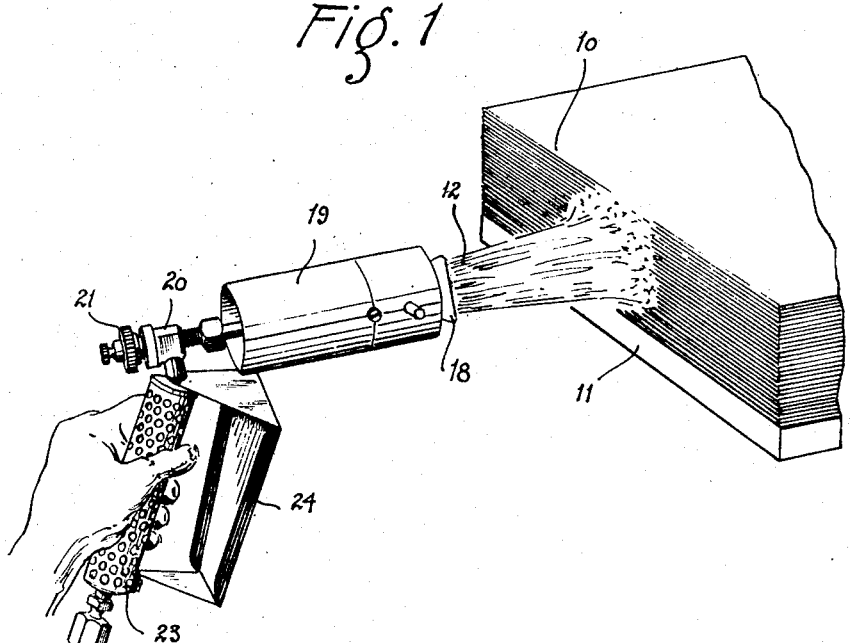
Fig. 1 is a perspective view of the fixation by means of a flame of a pile of cut-out fabrics.
Figure 2:
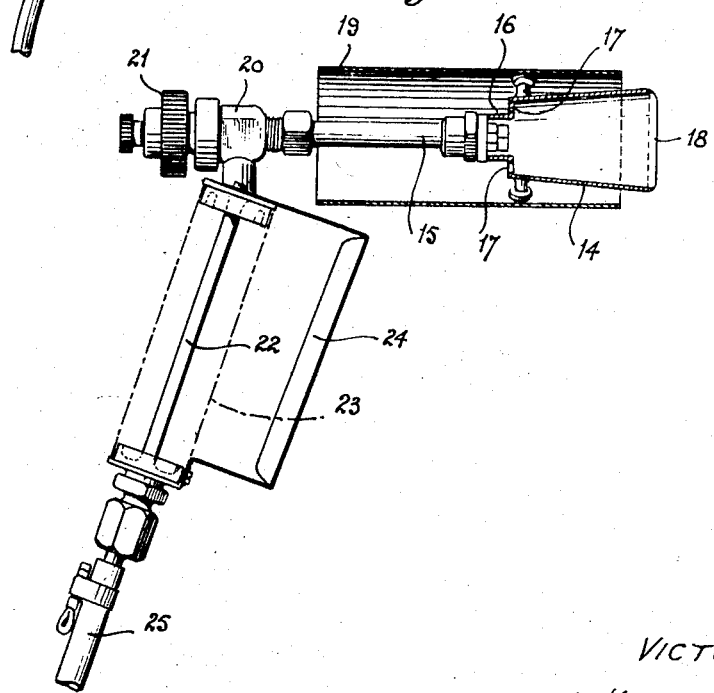
Fig. 2 shows in detail and partly in cross-section the device shown in Fig. 1 for producing the flame.

In the case of Figs. 1 and 2, the flame is produced by a portable gas burner. This is composed of a nozzle 14 to the centre of which the combustible gas is admitted through the pipe 15. Around the pipe 15 is mounted the circular member 16 which is provided with air-admission orifices 17, and on which is fixed the circular edge of the nozzle 14. The latter is shaped so as to have at 18 an elongated end section.

The unit comprised by the nozzle 14 and the pipe 15 is mounted in a protecting cylinder 19. The pipe 15 is provided at 20 with a coupling to the adjustment device 21. The coupling is fixed to the supply tube 22, which latter is surrounded by a protective tube 23 of perforated metal sheet which serves as a handle for using the device. A protective plate 24 is provided. The tube 22 is connected to the source of gas by a flexible tube 25.

When the gas is lit, the device produces a flame 12 in the form of a vertical layer by reason of the elongation of the extremity 18. This flame is brought into contact with the edges of the pile of fabric 10 and it is moved in the horizontal direction. The flame is passed over once or a number of times to ensure the melting of the edges and their fixation to prevent all fraying. By reason of the mechanical effect of blowing induced by the flame, the edges of the superposed fabrics melt without sticking to each other.

Figure 3:
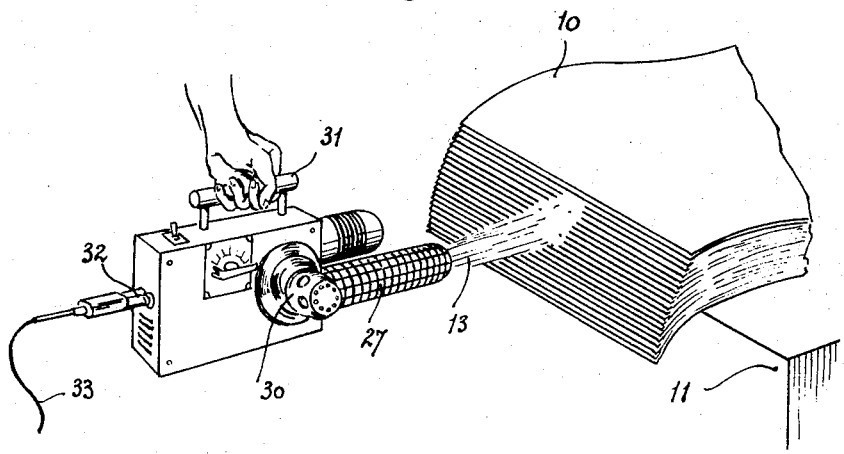
Fig. 3 is a view in perspective of the fixation of the edges of a pile of fabrics by a jet of hot air.
Figure 4:
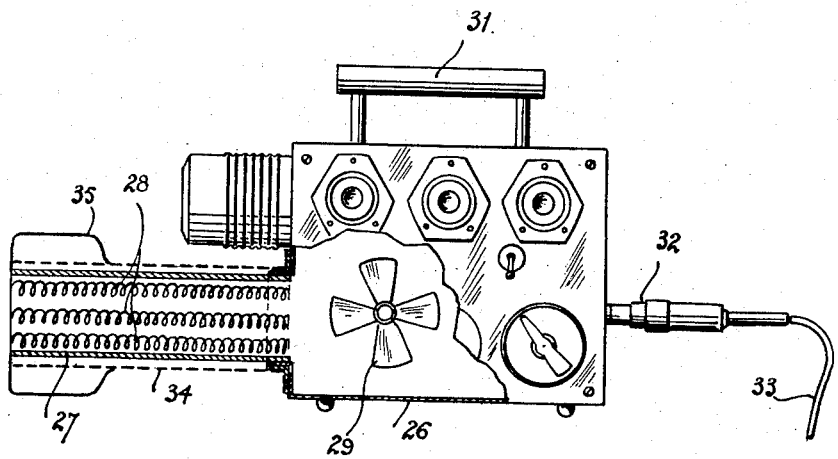
Fig. 4 is a view in detail and partly in cross-section, of the hot-air generator of Fig. 3.

Instead of bringing the edges of the superposed fabrics into the same vertical plane, they may be slightly staggered with respect to each other, as shown in Fig. 3. In this figure, the fixation of the edges has been provided for by means of a device for blowing air heated by electric resistances. This device is composed of a casing 26 on which is fixed a tube 27 which carries the heating resistances 28. Inside the box is mounted a fan 29 driven by a motor 30. The casing 26 is provided with a handle 31 and with appropriate electrical apparatus: a knob for controlling the intensity of the heating, for controlling the speed of the fan, measuring and control apparatus. The whole unit is connected to the current supply by the plug 32 and the flexible connection 33. The tube 27 is provided with a protective casing 34 of perforated sheet steel with a guard 35.

When the connection 33 has been plugged in, the apparatus produces a jet of hot air at the outlet of the tube 27, when a suitable temperature has been reached. By applying the blown hot air over the edge of the pile of fabric 10, the edges are melted, thus preventing fraying.

What I claim is:

A method of preparation of pieces of fabric made of threads of fusible plastic materials and cut-out for the manufacture of ready-made articles of clothing, the said method consisting in the simultaneous cutting of a pile of superposed thicknesses of the said fabric, subjecting the edges of the uncompressed pile of superposed cut-out pieces to the simultaneous action of heating to a temperature greater than the temperature of fusion of the said plastic material and to a blowing action to separate the pieces of fabric from each other while fusing the edges of the said fabrics without welding the pieces together.

References Cited in the file of this patent
UNITED STATES PATENTS

| | | |
|---|---|---|
| 2,426,328 | Wandel et al. | Aug. 26, 1947 |
| 2,465,254 | Morel | Mar. 22, 1949 |
| 2,481,602 | Lindh | Sept. 13, 1949 |
| 2,484,003 | Simison | Oct. 4, 1949 |
| 2,760,250 | Bernillon | Aug. 28, 1956 |